(12) United States Patent
Iversen

(10) Patent No.: US 7,815,497 B2
(45) Date of Patent: Oct. 19, 2010

(54) APPARATUS AND METHOD FOR CUTTING-FREE OF TENDER-LOIN

(75) Inventor: Thomas Peter Iversen, Taastrup (DK)

(73) Assignee: Slagteriernes Forskningsinstitut, Roskilde (DK)

(*) Notice: Subject to any disclaimer, the term of this patent is extended or adjusted under 35 U.S.C. 154(b) by 0 days.

(21) Appl. No.: 12/065,881

(22) PCT Filed: Sep. 1, 2006

(86) PCT No.: PCT/DK2006/000479

§ 371 (c)(1),
(2), (4) Date: Mar. 5, 2008

(87) PCT Pub. No.: WO2007/028386

PCT Pub. Date: Mar. 15, 2007

(65) Prior Publication Data
US 2008/0274682 A1    Nov. 6, 2008

(30) Foreign Application Priority Data
Sep. 6, 2005    (DK) ............................ 2005 01239

(51) Int. Cl.
A22C 21/00    (2006.01)
(52) U.S. Cl. .................................... 452/171
(58) Field of Classification Search ......... 452/149–153, 452/160, 171
See application file for complete search history.

(56) References Cited
U.S. PATENT DOCUMENTS 2,366,666 A    1/1945 Chapman
2,419,424 A    4/1947 Staab
3,456,284 A    7/1969 Werner
4,087,886 A    5/1978 Aubert .......................... 17/52

(Continued)

FOREIGN PATENT DOCUMENTS
EP    0 180 454 A2    5/1986

(Continued)

OTHER PUBLICATIONS
International Search Report from PCT/DK2006/000479, mailed Oct. 31, 2006 (5 pages).

(Continued)

Primary Examiner—Thomas Price
(74) Attorney, Agent, or Firm—Marshall, Gerstein & Borun LLP

(57) ABSTRACT

The invention relates to an apparatus for cutting free of at least a part of a tenderloin in a suspended half-carcass. The apparatus comprises a fixture (1) having a pubic bone catch (2) for positioning and support of the half-carcass by the pubic bone thereof. Further the apparatus comprises a cutting device (7) having a sharp edge (9) curving transversely to the edge (9), and a moving device for the cutting device (7) for moving the cutting device (7) with the sharp edge (9) foremost during cutting free of at least a part of the tenderloin in a half-carcass positioned in the pubic bone catch. Moreover, the invention relates to a fixture for a half-carcass or a hindquarters thereof, a pubic bone catch (2) for use in the above apparatus, a cutting device, and a method for cutting free of at least a part of a tenderloin in a suspended half-carcass.

27 Claims, 9 Drawing Sheets

U.S. PATENT DOCUMENTS

Figure 1:
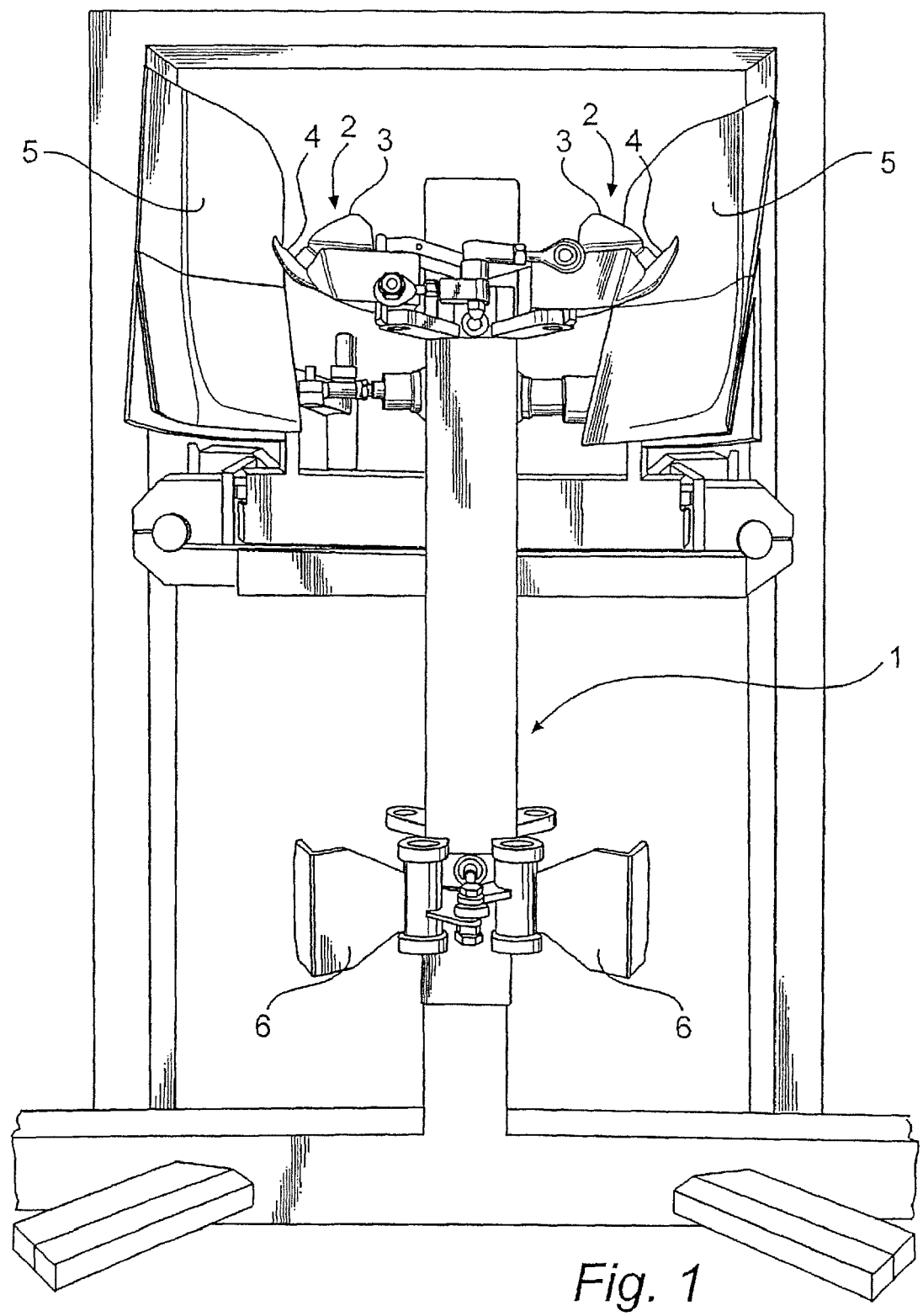

| | | | |
|---|---|---|---|
| 4,653,150 A * | 3/1987 | Leining | 452/160 |
| 4,667,371 A * | 5/1987 | Vogt | 452/152 |
| 5,346,435 A * | 9/1994 | Green et al. | 452/160 |
| 5,542,878 A * | 8/1996 | Sheedy et al. | 452/135 |
| 5,613,905 A * | 3/1997 | Van Ochten et al. | 452/160 |
| 5,626,515 A | 5/1997 | Krogh | |
| 5,688,164 A | 11/1997 | Mills et al. | 452/122 |
| 6,050,889 A * | 4/2000 | Jacobs et al. | 452/160 |
| 7,510,468 B2 * | 3/2009 | Clifford et al. | 452/160 |

FOREIGN PATENT DOCUMENTS

| | | |
|---|---|---|
| EP | 0 300 940 | 1/1989 |
| EP | 0 594 528 B1 | 4/1996 |
| EP | 0 879 558 A2 | 11/1998 |
| EP | 0 898 894 | 3/1999 |
| EP | 1 356 902 A1 | 10/2003 |
| EP | 1 417 889 A2 | 5/2004 |
| FR | 2 689 373 | 10/1993 |

OTHER PUBLICATIONS

Swedish Search Report, dated Dec. 1, 2004.

* cited by examiner

APPARATUS AND METHOD FOR CUTTING-FREE OF TENDER-LOIN

REFERENCE TO RELATED APPLICATIONS

This is the United States National Phase under 35 U.S.C. §371 of international application PCT/DK2006/000479, having an international filing date of Sep. 1, 2006, and claims priority to Danish application PA 2005 01239, filed Sep. 6, 2005.

FIELD OF THE DISCLOSURE

The disclosure relates to an apparatus and a method for cutting-free at least a part of a tenderloin in a suspended half-carcass.

BACKGROUND OF THE DISCLOSURE

After splitting of a carcass on a slaughterline the two half-carcasses belonging together are transported further along the line hung on gambrels. The half-carcasses can be connected at the snout, in a part of the neck fat or be fully parted. In certain situations the head can be cut off early in the slaughterline for reasons of hygiene. The present invention relates to cutting free of the tenderloin from the carcasses after splitting of these.

By cutting free the tenderloin from a half-carcass on a slaughterline, it is important that the cutting-free takes place with utmost precision. Today this is done manually. Tenderloin has a relatively high price, which however requires as a prerequisite that the tenderloin is correctly cut-free from the carcass. It is hence important that the tenderloin is not damaged during the cutting-free, and that undesirable sinews and membranes are not cut free together with the tenderloin. A major part of the precision in cutting-free is dependent on that the cutting-free is initiated at precisely the right place. By an automatic cutting-free it is hence very important to be able to perform a very quick and correct positioning of cutting tool and carcass relatively to each other before the cutting-free is initiated.

The speed by which the cutting-free is carried out is in particular important considering the very high pace by which carcasses are processed on a slaughterline. 350 or more animals per hour are often slaughtered on a slaughterline, which corresponds to a pace from arrival at a processing station to arrival of the next carcass of about 10 seconds. Within this period of time a plurality of processing steps must be performed in an automated equipment. This sets high standards for the speed by which the cutting-free takes place. Further the high pace means that the tolerance of errors is low, i.e. that in practice there is not time to correct an inadequate or inaccurate cutting-free. This means that a very stable and high level of precision is required.

The method used today for cutting-free a tenderloin can be performed by manually cutting free the tenderloin from the carcass using a knife or the like. This type of cutting-free causes relatively high degree of irregularity in the tenderloins cut free. Further it is a time consuming procedure which simultaneously exposes the operator to danger, as the cutting pattern is complicated.

An often used method for cutting free the tenderloin in a carcass is that the tenderloin is pre-cut, the carcass is cooled down, and an operator subsequently pulls out the tenderloin manually. Cooling down of the carcass after the pre-cutting is performed so that the tenderloin can maintain its characteristic guttiform shape. It is evident that the manual interaction between the operator and the carcass is very inconvenient taking account of the high pace on the slaughter line. Moreover the manual pulling of the tenderloin is difficult to control precisely, and hence an undesirable variation of the quality of the tenderloins which are pulled manually arises.

Hence there is a plurality of drawbacks by the known techniques for cutting free tenderloins in a carcass. Firstly the prior art techniques involve a manual step. This makes them subject to human error and considerably limits the speed by which the cutting free can take place. Further the precision of the cutting free can vary from operator to operator, and the result is hence irregular tenderloins, which require varying degrees of finishing treatment. By the manual step the operator is exposed to a risk which is not negligible, and the risk increases with increased speed for cutting-free. It is hence difficult or impossible to increase the efficiency without detrimental effect on safety and/or precision.

The above mentioned drawbacks with the prior art techniques causes that there is a need to provide a new, more safe, more precise and quicker method and a corresponding apparatus for use by cutting free of a tenderloin from a carcass.

It is the object of the present disclosure to fully or partially remedy the above drawbacks and meet the need mentioned. More specifically it is an object of the present invention to provide an apparatus, which ensures a quick, precise and uniform cutting-free of tenderloins from carcasses.

It is further an object to provide an apparatus, which makes cutting-free of a tenderloin from a carcass independent of manual steps.

It is moreover an object of the present disclosure to provide an apparatus by which the risk associated with cutting free of a tenderloin from a carcass can be minimized, including the risks of repetitive strain injury.

Finally it is an object of the present disclosure to provide a method for cutting-free at least part of a tenderloin in a suspended half-carcass, which possibly takes advantage of the above apparatus.

SUMMARY OF THE DISCLOSURE

An apparatus of the present disclosure comprises a fixture with a pubic bone catch for positioning and supporting the half-carcass by the pubic bone thereof, and that the apparatus further comprises a cutting means having a sharp edge curving transversely to the edge, and an activation means for the cutting means to move the cutting means with the sharp edge foremost during cutting-free of at least a part of the tenderloin in a half-carcass positioned in the pubic bone catch. By "curving transversely" should be understood that the sharp edge is arranged having a pointed edge thereof arranged in a first direction, and that the sharp edge will describe a curve when the course of the sharp edge is projected to a plane arranged at right angles to the first direction.

By providing an apparatus with a fixture comprising a pubic bone catch is achieved that a half-carcass from which the tenderloin is to be cut free can be positioned in the fixture relative to the pubic bone of the carcass. As the pubic bone anatomically is situated in a fixed position relative to the tenderloin, it is possible to determine the position of the tenderloin from the position of the pubic bone. Having fixed the carcass relative to the pubic bone thereof, it is known precisely in what distance and direction from the point of fixation a possible cutting-free of the tenderloin should be initiated. By the apparatus according to the present disclosure further comprising a cutting means, which is adapted for cutting free of the tenderloin, it is ensured that cutting-free of the tenderloin can be effected in a correct way. It should be mentioned that it would certainly be possible from the position of the pubic bone to predict positions of other anatomic parts in addition to the tenderloin. Positioning of a carcass by the pubic bone thereof could thus be useful in a plurality of other situations than by cutting free of tenderloin.

The pubic bone catch can have an upper, preferably sharp edge with a slope down towards an opposite upward edge, and the apparatus can comprise a lifting device for lifting the pubic bone catch to a predetermined supporting position or a lowering device for lowering the suspended half-carcass for support of the pubic bone on the pubic bone catch. By the sharp edge is obtained that as the pubic bone slides along it, the edge cuts through any sinews, cartilage or the like which could be present on the outside of the pubic bone. Thus the edge cuts all the way in to the bone and in this way ensures a more precise placing of the pubic bone in the pubic bone catch. The opposite upward edge ensures a simple and stable retention of the pubic bone in the correct position, and renders it simple to free the carcass from the fixture after cutting free of the tenderloin, and bring it further for possible subsequent processing on the slaughterline. The possibility to lift the pubic bone catch or lower the half-carcass renders it simple to position the pubic bone correctly in the pubic bone catch. The possible lifting or lowering devices could for example be constructed by use of automatically actuated pistons or the like.

The cutting means can comprise a hollow cylinder with an inner surface and an outer surface, and with the sharp edge in the first end, which end can be obliquely cut and have sharp edges on the oblique cuts. The possible oblique cut of the cylinder simplifies the process of cutting free, as the cutting means can be engaged against the tenderloin with the foremost part of the oblique edge right above the tenderloin and the cut part opposite the upper part of the tenderloin. Thus the upper part of the tenderloin can be cut free without damaging the rest of the tenderloin.

The sharp edge can have a position in extension of either the inner or outer surface of the cylinder, and this position of the sharp edge can be varied on different parts of the oblique cuts. Thus the sharp edge can for example be placed in extension of the outer surface of the cylinder at the position where the sharp edge shall cut through meat or other soft tissue. Hereby a precise and efficient cutting free from surrounding soft tissue is obtained. Reversed the sharp edge can be positioned in extension of the inner surface of the cylinder where the sharp edge shall cut along hard tissue, such as for example bones. Hereby is avoided that the sharp edge cuts into the hard tissue and potentially get stuck therein.

The moving device can be adapted for moving the cutting means in a predetermined path and direction relative to the pubic bone catch, so that the sharp edge cuts into the transition between the half-carcass and the tenderloin in the plane of splitting of the carcass. Hereby can be achieved great precision and speed in the process. The moving device can for example be an industrial robot of ordinary type, such as having 6 degrees of freedom.

The cutting means can be connected to a movable part of a manipulator, and the path and direction of movement relative to the pubic bone catch/the fixture can be programmed into the control unit of the manipulator.

The cutting means can comprise a sinew cutter adapted for severing sinews and other surrounding tissue by the tenderloin. This can contribute to correct and efficient cutting free of the tenderloin, as the sinew cutter quickly can sever tissue which the sharp edge of the cutting means can have difficulties in reaching.

The sinew cutter can further be arranged to be movable with the cutting means. This renders easy coordination of sinew severing and cutting free possible and makes the sinew cutter flexible in relation to the actual cutting means.

The moving device can be arranged at the side of the fixture adapted for introduction of the half-carcass in the fixture.

The fixture can comprise an upper displacement device adapted for at a mechanical pressure to fix an upper part of the half-carcass between the upper displacement device and the pubic bone catch. By such a fixation at the point of positioning displacement of the positioned anatomic part is prevented. This means that fixation can contribute in that the pubic bone remains in the pubic bone catch, and that there is no movement in the carcass when the cutting free takes place.

The upper displacement device can further comprise an abutment plate, and the pubic bone catch can further comprise means for moving the pubic bone catch in direction of the abutment plate to a predetermined position. Hereby fixation can be achieved in a simple and secure way.

The fixture can further comprise a lower fixation device coming into engagement with the spine of the half-carcass. Hereby contribution is made to secure retention in the correct position and swinging of the lower part of the carcass is prevented.

Further the lower fixation device can be movable between an open position and a fixed position, in which the fixation device exercises a securing force on the spine of the half-carcass. Hereby the desired fixation is achieved in a simple way.

The lower fixation device can further be designed as a movably mounted L-profile plate adapted for gripping the spine thereof. As the lower fixation device is gripping an anatomic part of the carcass, such as the spine, the fixation is made more precise and stable.

The apparatus can comprise a fixture for two half-carcasses suspended in gambrels, which fixture has a pubic bone catch for each of the half-carcasses.

The fixture can be movable between a first position, mainly corresponding to the course of the conveyor for suspended half-carcasses, and a second position, in which it is displaced in direction of the cutting means. This can be advantageous as the fixture then e.g. can be cleaned in a retracted position, and be used for processing of carcasses in a prominent position. Thus different steps can be separated physically, which can provide for improved hygiene and facilitated procedures of work.

The present disclosure further relates to a fixture for a half-carcass or hindquarters thereof. The fixture is characterized in that it comprises a pubic bone catch for positioning and supporting the half-carcass at the pubic bone thereof. The fixture has the above mentioned advantages in relation to positioning of tools and carcass/part of carcass in relation to each other. The fixture can be used by processing of carcasses with different tools or machines, in particular where the processing takes place in the hindquarters of the half-carcass. The fixture can be used for automated processing of ham parts from half-carcasses, e.g. in relation to severing of coccyx, sinews, lard, etc.

In an embodiment the fixture can comprise an upper, preferably sharp, edge inclining down towards an opposite, upward edge.

A pubic bone catch for use in the present invention can comprise an upper, preferably sharp edge inclining down towards an opposite upward edge. This is an advantageous design of the pubic bone catch.

A cutting means for use in the apparatus of the present disclosure can comprise a hollow cylinder with an inner surface and an outer surface, and with the sharp edge in one end thereof, which end can be obliquely cut and have sharp edges on the oblique cuts. This is an advantageous design of the cutting means.

The disclosure further relates to a method for cutting free of at least a part of a tenderloin in a suspended half-carcass, characterized in bringing the half-carcass into contact with a pubic bone catch in a fixture for the half-carcass; performing a relative vertical and if necessary horizontal movement of the half-carcass and the pubic bone catch, so that the underside of the pubic bone and the top side of the pubic bone catch comes into contact with each other and the pubic bone comes into a recess in the pubic bone catch, thereby positioning the half-carcass; and moving a cutting device with a sharp edge curving transversely to the edge by means of a moving device with the sharp edge in front under the process of cutting free at least a part of the tenderloin. By such a method is achieved that the half-carcass is positioned relatively to the pubic bone thereof and the position of the tenderloin thereby becomes known because of the fixed anatomic position thereof relative to the pubic bone. As the position of the tenderloin relative to the pubic bone catch therefore becomes known, the cutting free of the tenderloin by use of the cutting device can be initiated at the right spot.

The cutting device for use in the above method can be moved in a predetermined path and direction relative to the pubic bone catch, so that the sharp edge cuts in at the transition between the half-carcass and the tenderloin in the splitting plane of the carcass.

The cutting device can be designed as a cylinder having a cylinder with a sharp edge and a sinew cutter can be arranged movably at the cylinder. These features of the cutting device can improve and simplify the cutting free in conformity with the corresponding features of the apparatus described above.

By the above mentioned method the tenderloin can be cut free by leading the cutting device obliquely upwards over the head of the tenderloin, rotating the cutting device so that the head of the tenderloin is cut free, moving the cutting device to a downward-facing position, and leading the cutting device in the downward-facing position down the tenderloin, and hereby activating a possible sinew cutter, so that the tenderloin is cut free over a substantial distance along the spine.

This method of cutting free ensures firstly correct cutting free of the head of the tenderloin, whereupon the rest of the tenderloin is cut free.

The above method can comprise a step after the positioning and before the cuffing free, where the carcass is fixed using one or more device(s). Such a fixation can be advantageous to ensure that the carcass is retained in the fixed position and does not swing or move in other ways during the cutting free.

The above method can comprise a step after cuffing free of a part of the tenderloin, where the tenderloin is automatically pulled off and is transported away, for example to subsequent packaging. Such an automatic transport streamlines the cycle of operations at the slaughterline and helps to keep good hygiene, as manual steps are avoided.

SHORT DESCRIPTION OF DRAWING

Figure 2:
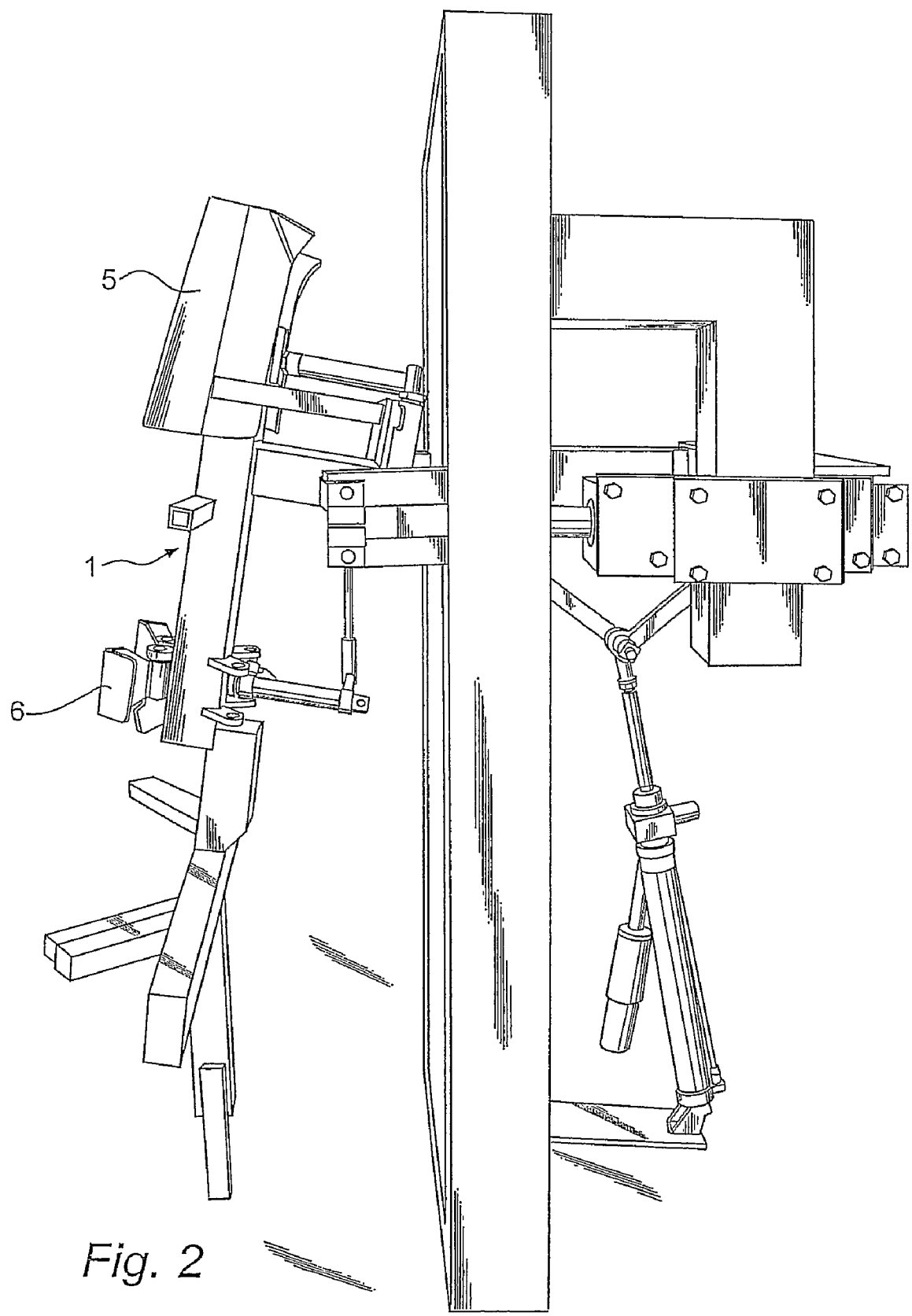
Figure 3A:
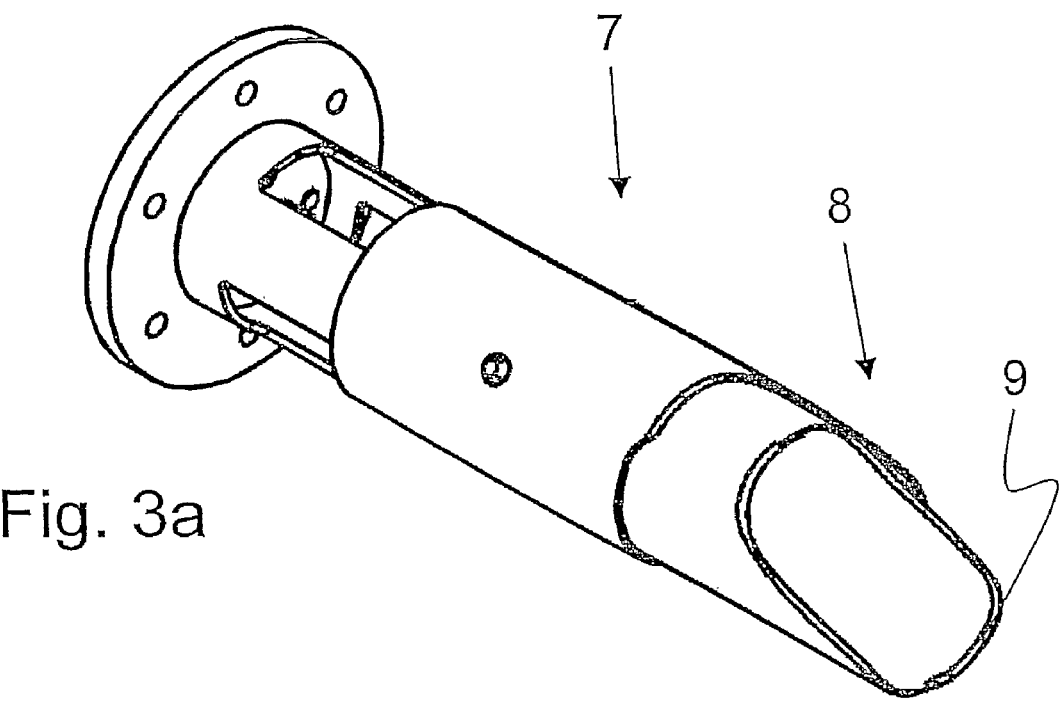
Figure 3B:
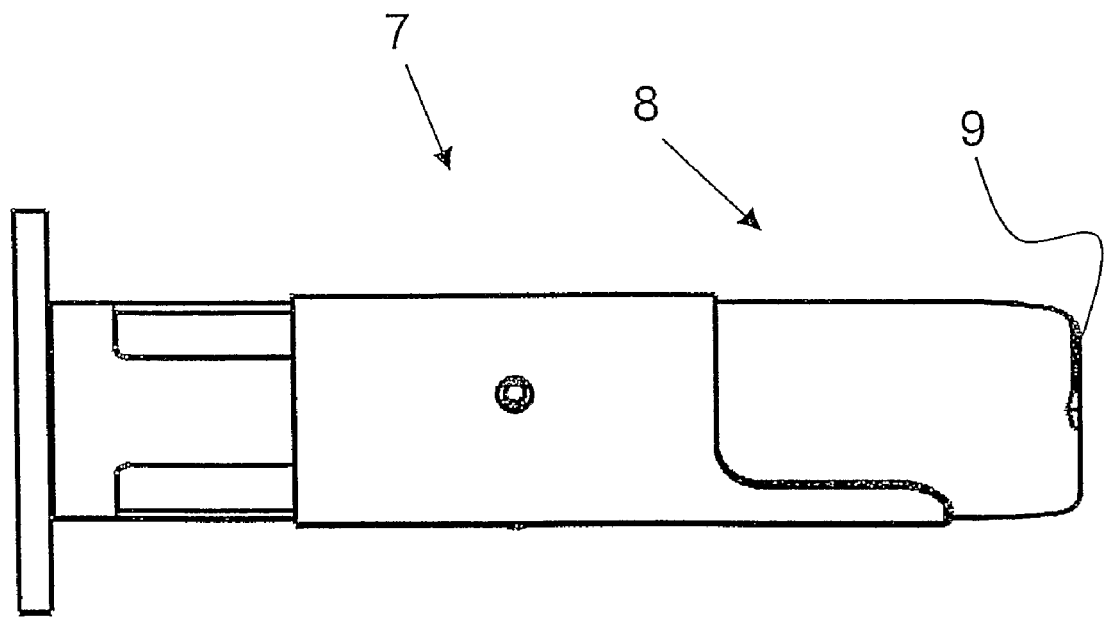
Figure 4:
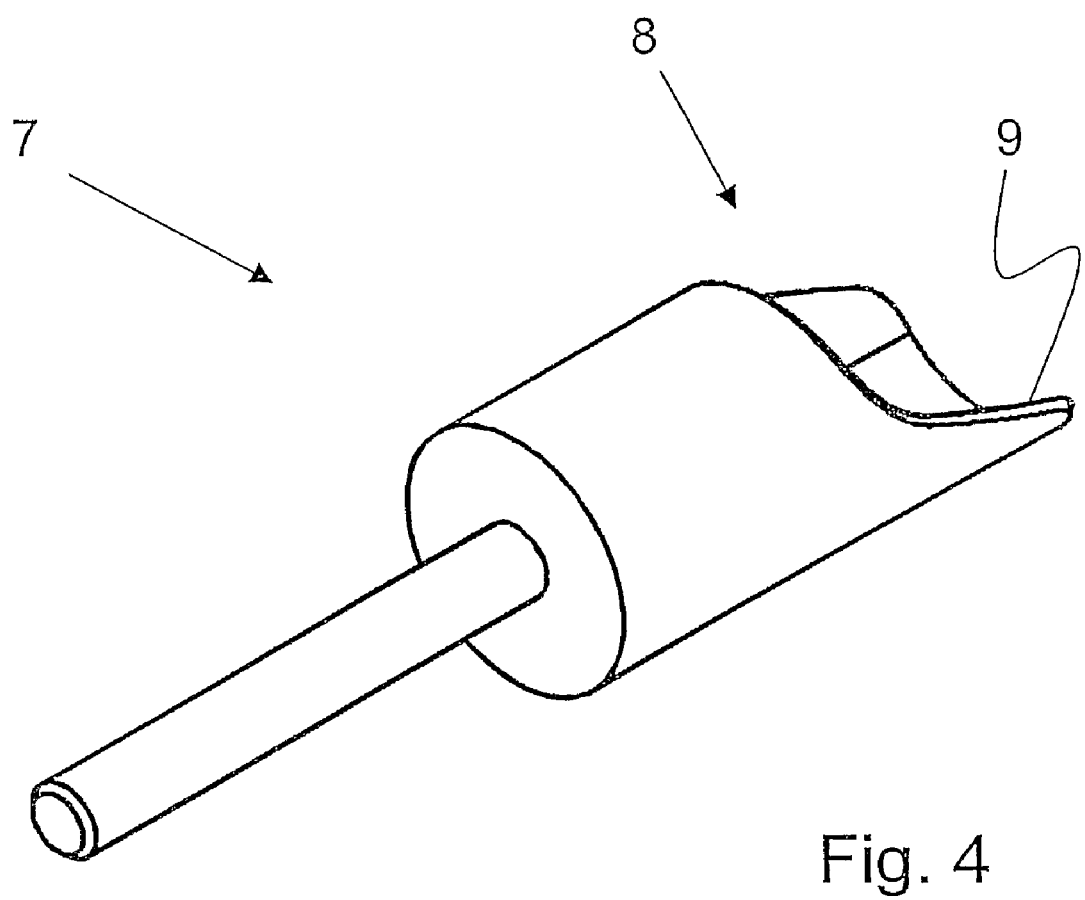
Figure 5:
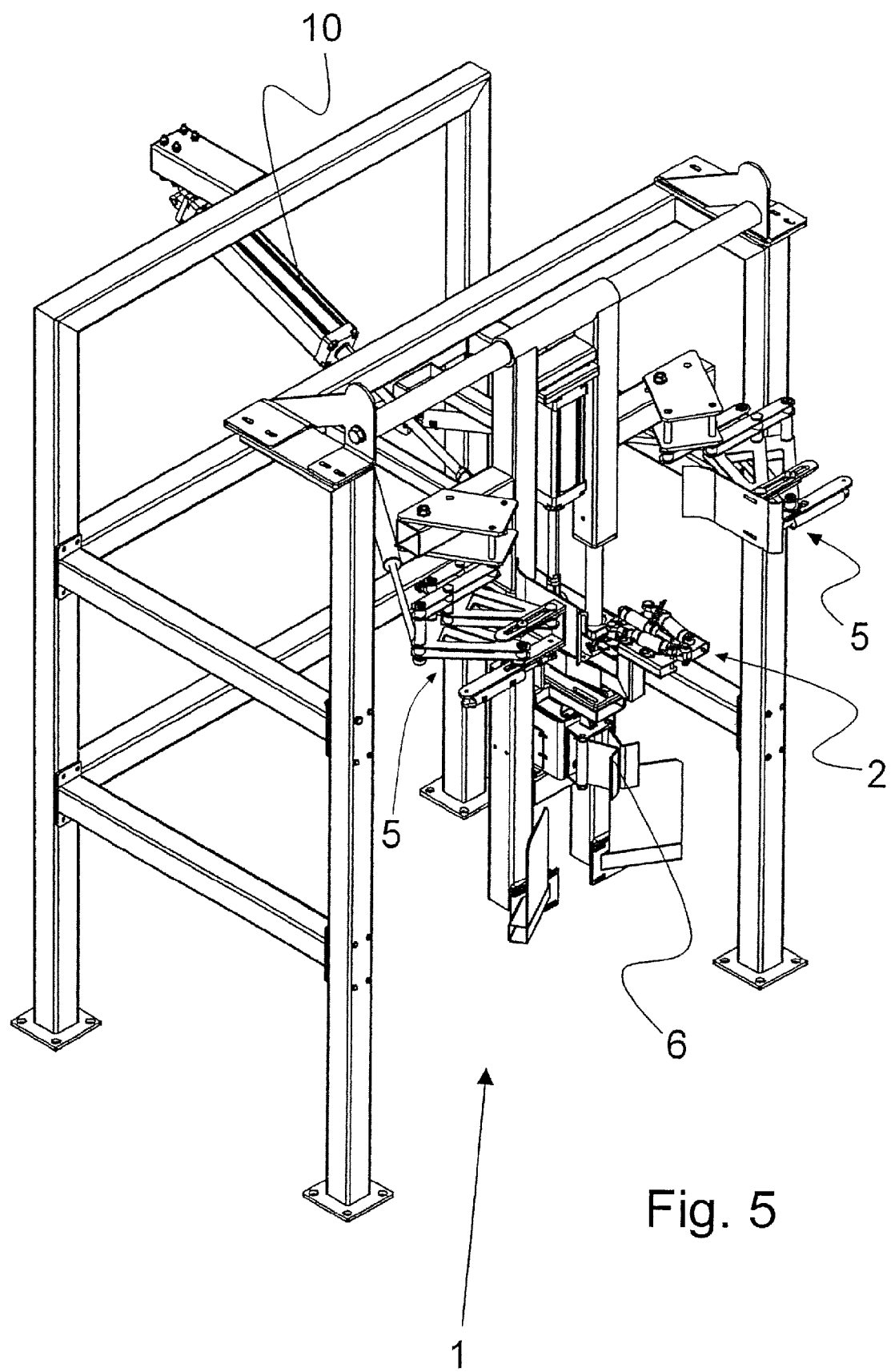
Figure 6A:
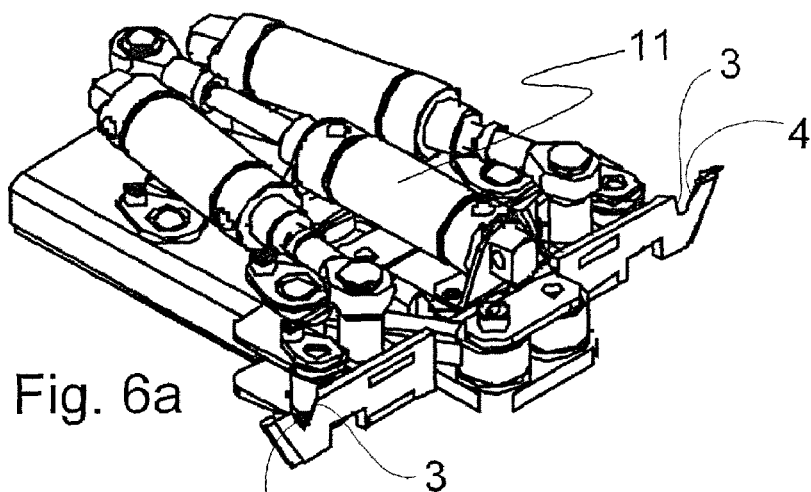
Figure 6B:
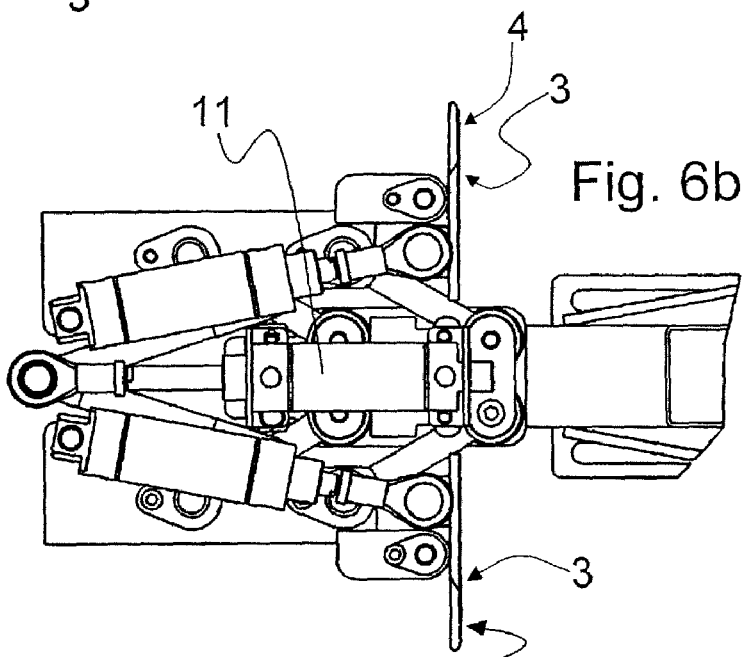
Figure 6C:
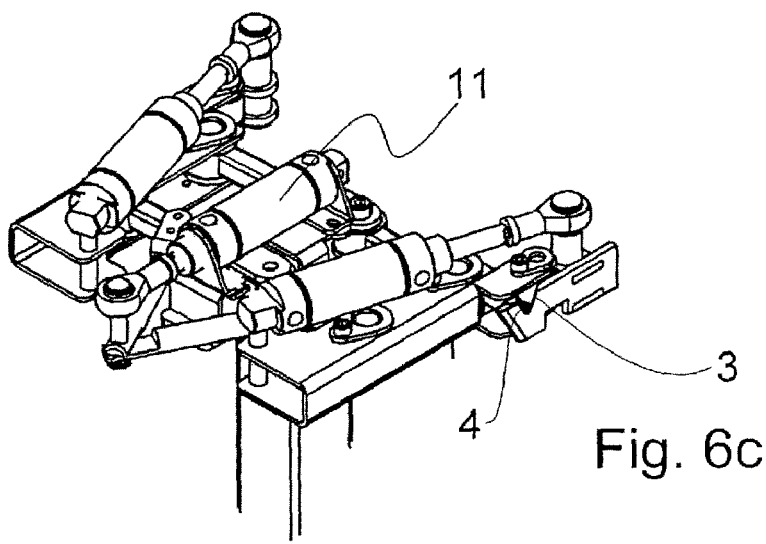
Figure 7A:
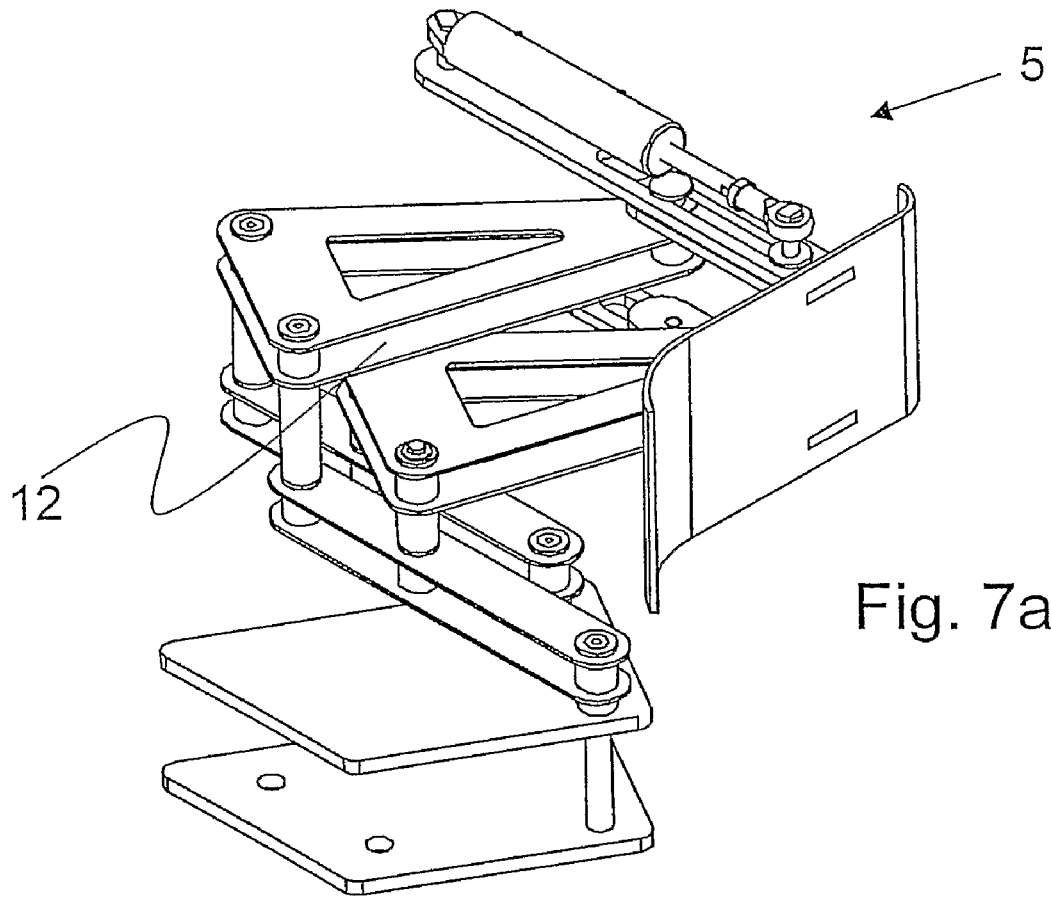
Figure 7B:
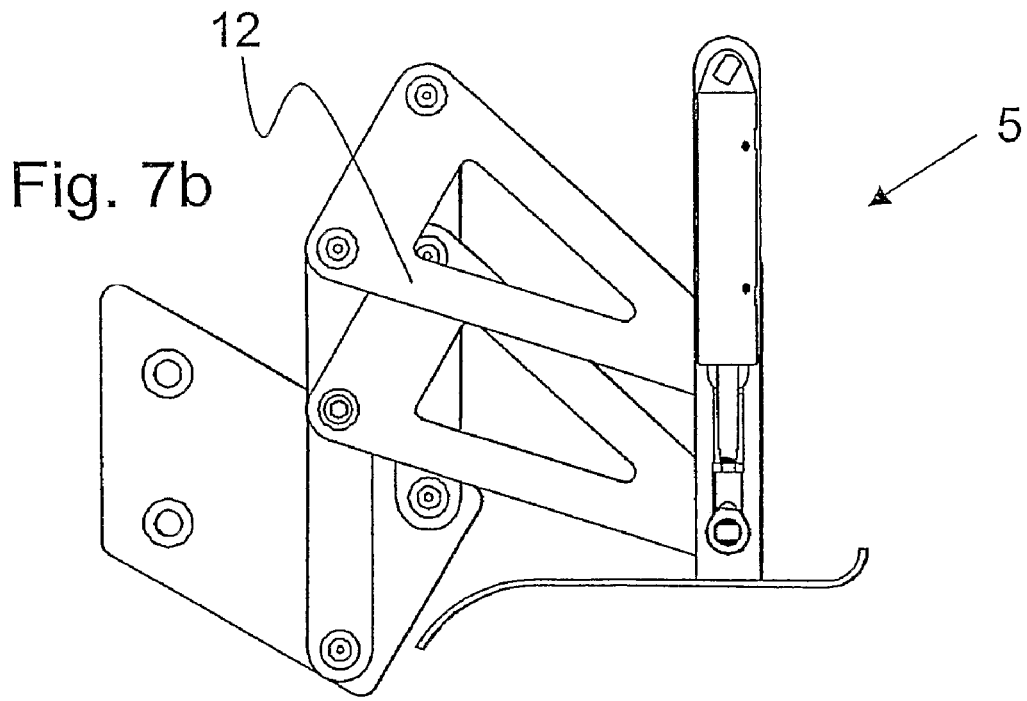

FIG. 1 shows a first embodiment of the fixture of the apparatus according to the present disclosure in front view,
FIG. 2 shows the fixture seen from the side,
FIG. 3*a* shows a first embodiment of a cutting device in perspective,
FIG. 3*b* shows the cutting device seen from the side,
FIG. 4 shows another embodiment of a cutting device,
FIG. 5 shows yet another embodiment of a fixture, FIG. 6*a*-6*c* show an embodiment of a pubic bone catch seen in perspective, from above and in another perspective, respectively,
FIGS. 7*a* and 7*b* show an embodiment of an upper displacement device seen in perspective and from above, respectively, and
FIG. 8*a*-8*d* are illustrations of a prototype of an apparatus according to the invention in successive steps of cutting free of tenderloin.

All figures are highly schematic, certainly not to scale, and show only parts necessary to illustrate the disclosure, whereas the remaining parts are left out or only sketched. Same numerals are used in all figures relating to identical or corresponding details.

DETAILED DESCRIPTION OF THE PREFERRED EMBODIMENTS

An apparatus according to the disclosure comprises a fixture, a cutting device and a moving device. The fixture 1 shown in FIG. 1 for two half-carcasses has two pubic bone catches 2 with a sharp edge 3 and an upward edge 4 and an upper displacement device 5 and a lower fixation device 6. Both devices are arranged to be movable. The upper displacement device 5 is movable between a fixating position close to the pubic bone catch 2 and an open position away from the pubic bone catch 2. The lower fixation device 6 is movable between an open position in which the two L-shaped plates are rotated forwards and is close to each other at the front of the fixture and a fixating position in which the L-shaped plates are rotated back against the rear side of the fixture. Moreover the pubic bone catch 2 can add to the fixation by being able to be moved between an open position away from the upper displacement device 5 and a fixating position directed against the upper displacement device 5. In FIG. 1 both devices 5 and 6 and the pubic bone catch 2 are shown in their fixing positions. Movement of the devices 5 and 6 and the pubic bone catch 2 preferably takes place by means of hydraulic pistons and can be coordinated so that fixation of the carcass takes place quickly and precisely. Within the idea of the invention pneumatic or mechanical operation can further be used.

By application on a slaughterline of a preferred embodiment according to the invention a carcass arrives, comprising two half-carcasses, typically suspended in the hindquarters in gambrels or hooks, to the fixture 1, whereupon the horizontal movement of the carcass is stopped. The carcass is then brought into contact with a pubic bone catch 2 and is lowered so that the pubic bone of the carcass is moved along the pubic bone catch 2 until it reaches an edge on the pubic bone catch 2. Subsequently cutting-free is initiated in a predetermined direction and distance from the pubic bone catch 2. In another embodiment the carcass is brought into contact with the pubic bone catch 2 by lifting the pubic bone catch 2 up against the pubic bone of the carcass. In yet another embodiment of the invention the horizontal movement of the carcass is not stopped by arrival at the fixture 1. On the contrary the fixture 1 is moved in such a way that it follows the carcass, and cutting free thus takes place while both the carcass and the fixture is moving. Positioning and possible fixation can take place during the movement as the fixture is moved by substantially the same speed and direction as the carcass, and therefore the two almost do not move relatively to each other, but solely in relation to the surroundings. Such a cutting free during movement can be desirable to be able to increase the speed by which the carcasses are processed and conveyed at the slaughterline.

The pubic bone catch 2 is in FIG. 1 shown as comprising a right and a left part. Those two parts are mirror-visions of each other and are both shown having a sharp edge 3 and an upward edge 4. Both the sharp edge 3 and the upward edge 4 are special parts of the preferred embodiment and can thus possibly be omitted. The sharp edge 3 and the upward edge 4 are however particularly advantageous, as they allow the pubic bone of the carcass to slide along the sharp edge 3 until the pubic bone rests at the upward edge 4. Hereby the sharp edge 3 cuts through tissue surrounding the pubic bone, if any, and hence contribute to correct positioning of the pubic bone in the pubic bone catch 2. The pubic bone catch 2 will typically be made in steel and can be rotatably attached to the fixture. The pubic bone catch 2 can comprise means for displacing or rotating the pubic bone catch 2 in different directions. Such means can for example be hydraulic pistons or pneumatic equipment. The pubic bone catch 2 can e.g. be arranged to be displaceable in direction of a half-carcass present in the fixture 1. The pubic bone catch 2 can similarly be arranged to be displaceable to and from in relation to the fixture 1 and possibly also to be able to rotate around a given axis. An embodiment of displaceable and rotatable pubic bone catches 2 are illustrated in FIG. 6 and is described further below. The pubic bone catch 2 can, however, be designed in other ways, e.g. as one unitary piece of metal, without thereby departing from the idea of the present disclosure.

The upper displacement device 5 is in FIG. 1 shown as being two large, curved abutment plates. The upper displacement device 5 can comprise means, for example hydraulic pistons, for displacing and/or rotating the upper displacement device 5. It can as an example be appropriate that the upper displacement device 5 can be rotated about an axis substantially corresponding to an anatomic part of a suspended half-carcass, such as the spine or leg. Such a rotation about a displaced axis can be achieved in that the upper displacement means 5 comprises means for rotation in which two parallelograms are displaced relative to each other, e.g. by means of hydraulic pistons, so that the upper displacement device 5 is rotating about an axis lying outside the displacement device 5. Such a preferred embodiment of the upper displacement device 5 is illustrated in FIG. 7. Rotation about a displaced axis can also be achieved in other ways. The upper displacement means 5 will typically be made of metal, such as steel, but can also be designed in other ways than illustrated. Moreover the upper displacement device 5 can be completely left out.

The lower fixation device 6 is in FIG. 1 shown as two L-shaped plates movably arranged on the fixture 1. The lower fixation device 6 is typically made in steel, but can possibly be completely left out or designed in other ways than illustrated.

By use of a preferred embodiment of the apparatus, as shown in FIG. 1, the fixation of the carcass is initiated when the pubic bone is resting in the pubic bone catch 2. This fixation takes place in that the upper displacement device 5 is moved against the pubic bone catch 2 and hence fixates the carcass between the upper displacement device 5 and the pubic bone catch 2. If necessary the pubic bone catch 2 is simultaneously moved in direction of the upper displacement device 5 to promote fixation. Further the lower fixation device 6 is moved against the carcass and grips the spine thereof, if necessary. By this fixation is achieved that the vertical position of the carcass can be used and maintained during cutting free of the tenderloin. Subsequently the actual cutting free of the tenderloin is initiated, which will be described in detail in a later paragraph. After cutting free is completed the devices 5 and 6 and possibly also the pubic bone catch 2 are moved to their open positions and the carcass can be lifted out of the pubic bone catch 2 and moved further along the slaughterline. In another embodiment the pubic bone catch is lowered to free the carcass. By using another preferred embodiment of the invention, positioning, fixation and cutting out is performed in the following steps, here exemplified with two half-carcasses: The half-carcasses arrive at the apparatus according to the invention; the fixture 1 is displaced to an advanced position; the upper displacement devices 5 are displaced inwards against their respective half-carcass; the pubic bone catches 2 are displaced outwards against the half-carcasses; the pubic bone catches 2 are displaced upwards along the half-carcasses until the pubic bone catches 2 come into contact with the pubic bones of the half-carcasses; the pubic bone catches 2 are displaced inwards so that the pubic bones slide along the sharp edge 3 and comes to rest at the upward edge 4; the half-carcasses are lifted up, if considered necessary, e.g. supported by the pubic bone catches 2; the upper displacement means 5 and the pubic bone catches are rotated so that the inner sides of the half-carcasses are exposed; possible lower fixation devices 6 fix the other parts of the half-carcasses; cutting out of the tenderloin is initiated. In the other preferred embodiment the half-carcasses are rotated and the inner sides of the half-carcasses are exposed after the pubic bones thereof are caught in the pubic catches.

In FIG. 2 is shown an apparatus according to the invention seen from the side. The apparatus comprises a fixture 1 having an upper displacement device 5 and a lower fixation device 6. Further the rear part of the apparatus is also seen in this illustration.

In FIG. 2 the fixture 1 is shown in an advanced position. The fixture 1 is in a preferred embodiment movable between a first position, substantially corresponding to the course of the slaughterline and a second, advanced position, in which it is advanced in direction of the cutting device and cutting free of the tenderloin can take place. Movement of the fixture 1 can advantageously take place by means of pistons, e.g. driven by means of hydraulics or pneumatics. Mechanical means for movement can also be used.

In FIG. 3 a cutting device 7 according to the invention is illustrated. The shown cutting means is cylindrical and has an obliquely cut end 8 with a sharp edge 9.

The cutting device 7 is in FIG. 3 illustrated as an obliquely cut cylinder, but can also be designed in other ways. The sharp edge 9 of the cutting device 7 can, as shown in FIG. 3, be arranged at the obliquely cut end 8 of the cutting device 7. By other designs of the cutting device 7 the sharp edge 9 can be positioned at any suitable place at the cutting device 7. By a cylindrical design of the cutting device 7 the sharp edge can be arranged in extension of either the inner or outer surface of the cylinder. This positioning of the sharp edge 9 can be varied on different parts of the cylinder to achieve correct cutting in surrounding tissue of various kinds, e.g. bones, sinews and muscles. The cutting device 7 can comprise a sinew cutter, adapted for severing sinews and other surrounding tissue at the tenderloin. The sinew cutter facilitates cutting free of the tenderloin and can possibly be movably mounted on the cutting device 7. The sinew cutter can be designed as a sharp blade, e.g. a rotatable blade or a movable knife. Alternatively the sinew cutter can be designed as a cylinder with a cutting part. Such a cylinder can for example lie at the outside of a cylinder shaped cutting device 7 and be displaced relatively thereto. Hereby a further cutting effect is achieved in addition to what the sharp edge 9 of the cutting device 7 causes. Finally the cutting device 7 can be connected to a manipulator (not shown). Automatic control of the cutting free, e.g. using a manipulator, will at the same time make the cutting free quicker, more precise and less dangerous for any personnel possibly involved. The manipulator can for example be a robotic arm.

By using a cutting device 7 having the preferred embodiment illustrated in FIG. 3 cutting free is initiated by advancing the cutting device 7 at an angle over the head of the tenderloin. Hereby the head of the tenderloin will be taken up in the obliquely cut end of the open cylinder of the cutting device 7. Subsequently the cutting device 7 is rotated so that the head of the tenderloin is cut free and the cutting device 7 is moved to a downward-facing position. Finally the cutting device 7 is moved along the tenderloin simultaneously to actuation of a sinew cutter, if fitted, so that the tenderloin is cut free over a substantial part along the spine.

In FIG. 4 another embodiment of a cutting device 7 according to the invention is illustrated. The shown cutting device is cylindrical and has an obliquely cut end 8 with a sharp edge 9.

In FIG. 5 is shown an embodiment of a fixture 1 according to the invention. The fixture comprises pubic bone catch 2, upper displacement devices 5, a lower fixation device 6 and a cylinder 10 adapted for displacement of the fixture 1. The pubic bone catches 2 are adapted for displacement up and down on the fixture 1 and can further be folded up and folded out by means of cylinders. The pubic bone catches 2 are further illustrated in FIGS. 6a-6c, wherein FIGS. 6a and 6b show the pubic bone catch 2 in a folded up position, where the central piston 11 is advanced, and where FIG. 6c shows the pubic bone catch 2 in an unfolded state, where the central piston 11 is compressed. In FIG. 6c is further seen a part of the fixture 1 on which the pubic bone catches are mounted. An upper displacement device 5 is further illustrated in FIGS. 7a and 7b. The shown upper displacement device 5 can be rotated about a displaced axis by means of the shown rotation means 12 of the double-parallelogram-type and by use of e.g. hydraulic pistons.

Figure 8A:
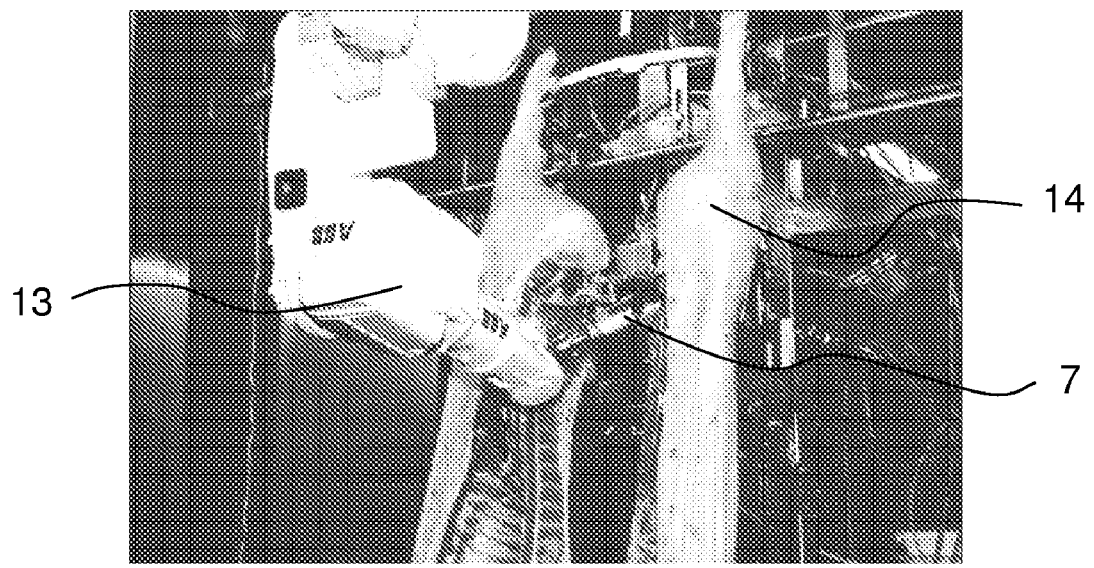
Figure 8B:
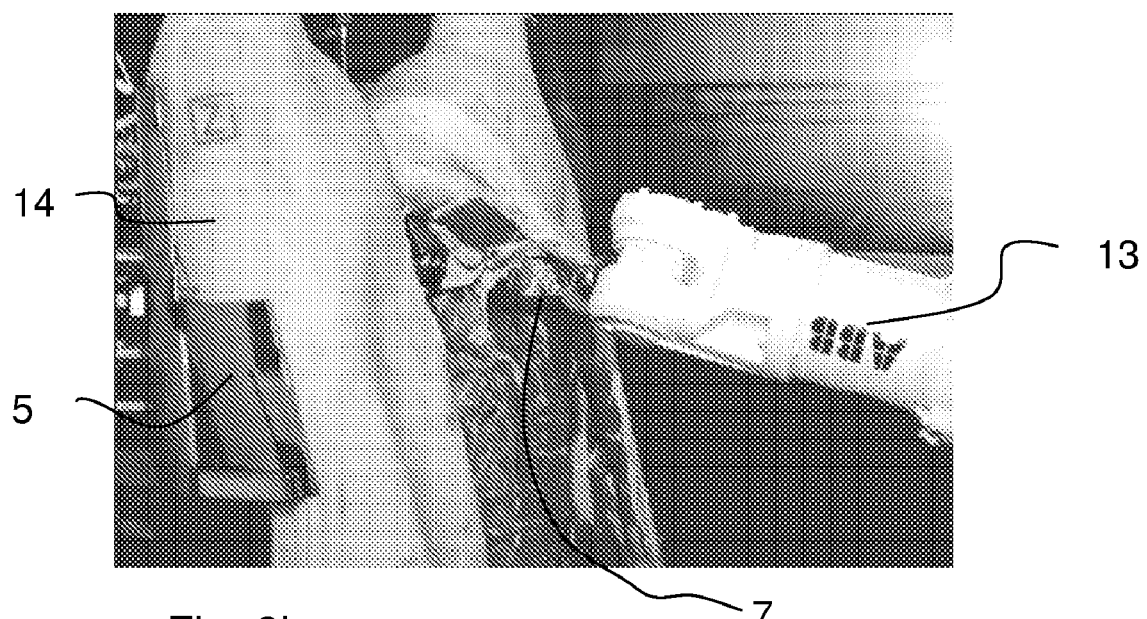
Figure 8C:
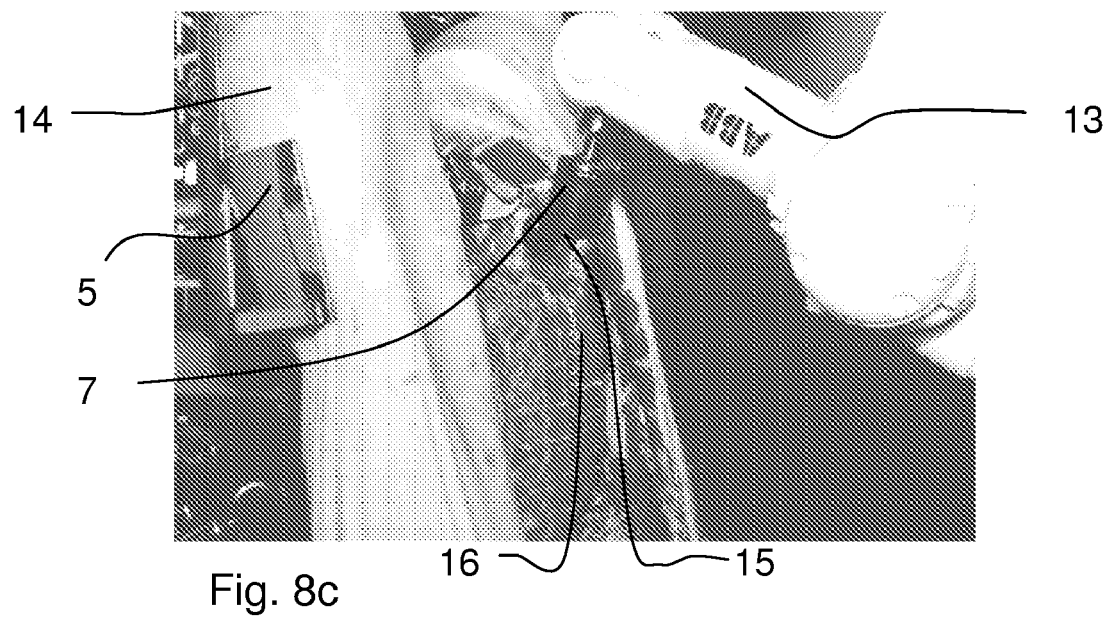
Figure 8D:
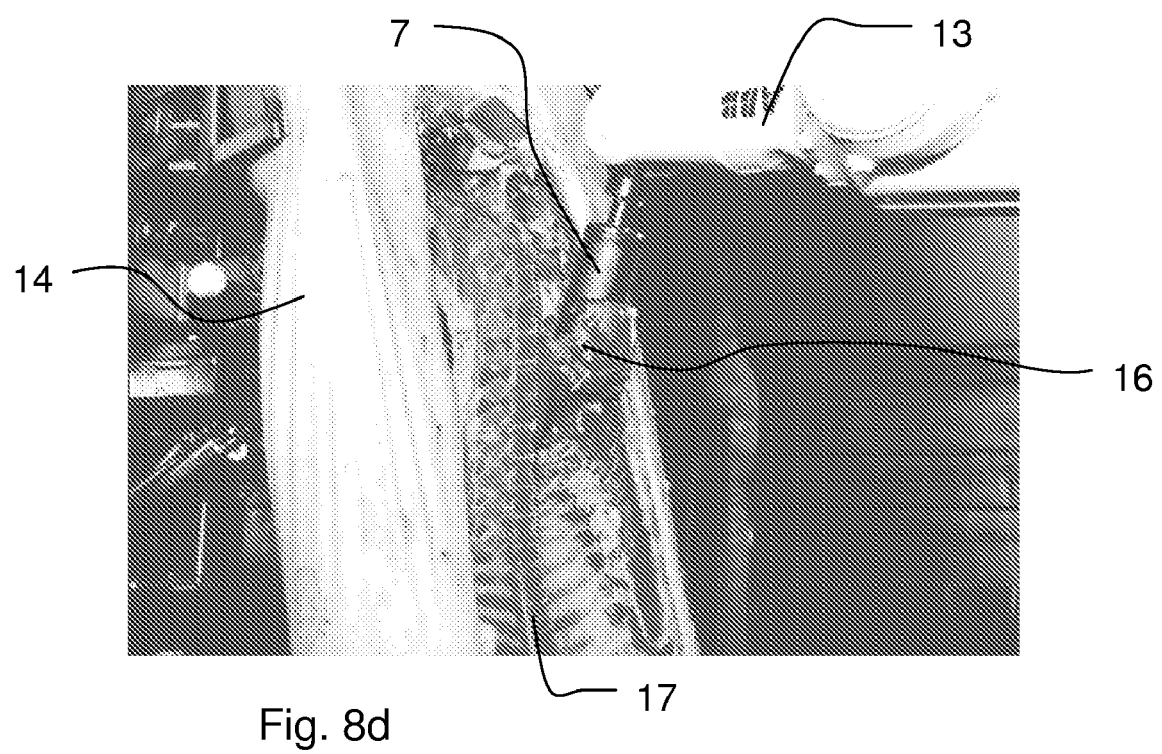

In FIGS. 8a-8d illustrations of a prototype of an apparatus for cutting-free of tenderloin can be seen in a sequence of successive steps. A set of two carcass-halves 14 are suspended from gambrels and spread open to lay open the inside of the carcass halves, e.g. to provide easy access to the tenderloin. An industrial robot 13 was used as moving device for the cutting means 7, which in the illustrated prototype was a socalled hollow punch. In FIG. 8a, the cutting means is at a position at the head of the tenderloin in one of the two half-carcasses 14. In FIG. 8b cutting free of the head of the tenderloin is initiated in that the cutting means 7 is moved into the half-carcass by the robot 13 to cut free the tenderloin head. In this initial part of the process of cutting free the tenderloin, the cutting edge is moved at approximately right angles to the inner surface of the carcass half to dig into the carcass at the head of the tenderloin, to substantially cut free the tenderloin head. In FIG. 8b the upper displacement device 5 can also be seen. This upper displacement device 5 provide for a firm backing of the respective half-carcasses to facilitate cutting free of the tenderloin. FIG. 8c illustrate a third step, in which the cutting means 7 is tilted somewhat by the robot 13 for downward movement of the cutting edge to cut free the tenderloin head 15 and a part of the tenderloin 16. In FIG. 8d can be seen a subsequent step in which the robot 13 moves the cutting means 7 downwards along the spine 17 for cutting free of a part of the tenderloin. Correspondingly the robot 13 will then move the cutting means 7 to the other carcass half 14 to cut free the tenderloin of the other carcass half in a similar process. In initial testing of the concept an ABB industrial robot of the type 140 with a controller of the type IRC5 was employed, but other types of robots or other kinds of suitable equipment, such as automatic or semiautomatic actuators may be employed as alternatives.

Even though the invention above is described based on preferred embodiments, it is clear to a skilled person that several modifications and improvements are possible without departing from the idea of the invention, as defined by the following claims. For example the cutting means may be a wizard knife, i.e. a knife with a rotating blade, or any other suitable cutting means.

Even though it is currently preferred to cut the tenderloin from a suspended carcass, it is evident that it will be possible to cut free the tenderloin from a carcass, which is not suspended, but instead arranged more or less horizontal, such as lying on a conveyor.

Further the skilled person will acknowledge that the described directions etc. are relative, so that e.g. terms like "vertical", "horizontal" are not necessarily to be understood literally in strict meaning, but broadly as relative terms. Further the skilled person will acknowledge that kinematic reversal is often possible.

The invention claimed is:

1. Apparatus for cutting free of at least a part of a tenderloin in a suspended half-carcass, wherein the apparatus comprises a fixture (1) having a pubic bone catch (2) for positioning and supporting the half-carcass by the pubic bone thereof, and the apparatus further comprising a cutting device (7) having a curvilinear sharp edge (9), and an industrial robot including a manipulator for moving the cutting device (7) with the sharp edge (9) foremost during cutting free of at least a part of the tenderloin in a half-carcass positioned and supported by the pubic bone catch.

2. Apparatus according to claim 1, wherein said pubic bone catch (2) comprises an upper sharp edge (3) with a slope down towards an opposite, upward edge (4) and that the apparatus comprises a lifting device for lifting the pubic bone catch (2) to a predetermined, supporting position or a lowering device for lowering a half-carcass for support of a pubic bone thereof on the pubic bone catch (2).

3. Apparatus according to claim 1 wherein the cutting device (7) comprises a hollow cylinder with an inner surface and an outer surface, and with the sharp edge (9) at one end (8), which end (8) can be obliquely cut and have sharp edges (9) on the oblique cuts.

4. Apparatus according to claim 3, wherein the sharp edge (9) has a position in extension of either the inner or outer surface of the cylinder, and that this position of the sharp edge (9) can be varied at different parts of the oblique cuts.

5. Apparatus according to claim 1, wherein the manipulator of the industrial robot is adapted for moving the cutting device (7) in a predetermined path and direction relative to the pubic bone catch (2), so that the sharp edge (9) cuts at the transition between the half-carcass and the tenderloin in the splitting plane of the carcass.

6. Apparatus according to claim 1, wherein the cutting device is connected to a movable part of the manipulator, and the path and direction of movement of the cutting device relative to the pubic bone catch/fixture is programmed into the control unit of the manipulator.

7. Apparatus according to claim 1, wherein the moving device is positioned at the side of the fixture intended for introduction of the half-carcass in the fixture.

8. Apparatus according to claim 1, wherein the fixture (1) comprises an upper displacement device (5), adapted for fixing an upper part of the half-carcass between the upper displacement device (5) and the pubic bone catch (2) by mechanical pressure.

9. Apparatus according to claim 8, wherein the upper displacement device (5) comprises an abutment plate and that said pubic bone catch (2) comprises means for moving the pubic bone catch (2) against the abutment plate to a predetermined position.

10. Apparatus according to claim 1, wherein the fixture (1) further comprises a lower fixation device (6), engaging with the spine of the half-carcass.

11. Apparatus according to claim 1, further comprising a fixture for two half-carcasses, suspended in gambrels, which fixture has a pubic bone catch for each half-carcass.

12. Apparatus according to claim 1, wherein the fixture (1) is arranged to be movable between a first position, corresponding mainly to the course of the conveyor for suspended half-carcasses, and a second position, in which it is displaced in direction of the cutting device (7).

13. Pubic bone catch (2) for use in the apparatus according to claim 1, further comprising an upper sharp edge (3) having a slope down towards an opposite upward edge (4).

14. Fixture for a half-carcass or a hindquarter thereof, said fixture comprising a pubic bone catch for positioning and support of the half-carcass by the pubic bone thereof, wherein the pubic bone catch comprises an upper sharp edge (3) having a slope down towards an opposite, upward edge (4).

15. Pubic bone catch (2) for use in the fixture according to claim 14, further comprising an upper edge (3) having a slope down towards an opposite upward edge (4).

16. Pubic bone catch (2) of claim 15, wherein the upper edge is a sharp edge.

17. Method for cutting free of at least a part of a tenderloin in a suspended half-carcass, including:
bringing the half-carcass into contact with a pubic bone catch (2) in a fixture for the half-carcass;
performing at least a relative vertical movement between the half-carcass and the pubic bone catch (2), so that the underside of the pubic bone and the top side of the pubic bone catch (2) comes into contact with each other and the pubic bone comes into a recess in the pubic bone catch (2), whereby the half-carcass is positioned; and
moving a cutting device (7) having a curvilinear sharp edge (9) using an industrial robot including a manipulator, with the sharp edge foremost during cutting free of at least a part of the tenderloin.

18. Method according to claim 17, including moving the cutting device (7) in a predetermined path and direction relative to the pubic bone catch, so that the sharp edge (9) cuts in at the transition between the half-carcass and the tenderloin in the splitting plane of the carcass.

19. Method according to claim 17, wherein cutting free of the tenderloin is performed by
advancing the cutting device (7) at an angle upwards over the head of the tenderloin,
rotating the cutting device (7) so that he head of the tenderloin is cut free,
moving the cutting device (7) to a downward-facing position, and
moving the cutting device (7) in the downward-facing position along the tenderloin.

20. Method according to claim 19, wherein after moving the cutting device in the downward-facing position along the tenderloin, activating a sinew cutter, so that the tenderloin is completely cut free over a substantial distance along a spine of the half-carcass.

21. Method according to claim 17, wherein the method further comprises a step after the positioning and before the cutting free, in which the carcass is fixed by use of one or more device(s) (5, 6).

22. Method according to claim 17, wherein the method further comprises a step after cutting free of a part of the tenderloin, in which the tenderloin is automatically pulled off and transported away.

23. Method for positioning a half-carcass, including:
bringing the half-carcass into contact with a pubic bone catch having a predetermined position; and
performing at least a relative movement in the lengthwise direction of the half-carcass between the half-carcass and the pubic bone catch, so that the pubic bone and the pubic bone catch come into contact with each other and the pubic bone comes into rest in a recess in the pubic bone catch, whereby the half-carcass is positioned.

24. Method according to claim 23, wherein in bringing the half-carcass into contact with the pubic bone catch, the half-carcass is hanging from its hind leg, the pubic bone catch having an upper, sharp edge sloping down towards an opposite, upward edge.

25. Method for performing a slaughter operation on an anatomic part of a suspended half-carcass, where the half-carcass is positioned in its lengthwise direction by bringing its pubic bone into contact with a pubic bone catch having a predetermined position, and wherein the position of the anatomic part is predicted from the position of the pubic bone catch.

26. Method according to claim 25, where the slaughter operation is performed by an industrial robot including a manipulator, and where the industrial robot is programmed with paths of movement calculated relative to the predicted position of the anatomic part.

27. Method according to claim 25, wherein the half-carcass is hanging from its hind leg, and wherein the pubic bone catch has an upper, sharp edge sloping down towards an opposite, upward edge.

* * * * *